United States Patent
Reinarz

(10) Patent No.: US 10,035,304 B2
(45) Date of Patent: Jul. 31, 2018

(54) METHOD AND DEVICE FOR PRODUCING COMPONENTS IN A BEAM MELTING INSTALLATION

(71) Applicant: EOS GmbH Electro Optical Systems, Krailling (DE)

(72) Inventor: Bernd Reinarz, Meerbusch (DE)

(73) Assignee: EOS GmbH Electro Optical Systems, Krailling (DE)

( * ) Notice: Subject to any disclaimer, the term of this patent is extended or adjusted under 35 U.S.C. 154(b) by 304 days.

(21) Appl. No.: 14/395,284

(22) PCT Filed: Apr. 10, 2013

(86) PCT No.: PCT/EP2013/001050
§ 371 (c)(1),
(2) Date: Oct. 17, 2014

(87) PCT Pub. No.: WO2013/156119
PCT Pub. Date: Oct. 24, 2013

(65) Prior Publication Data
US 2015/0115490 A1 Apr. 30, 2015

(30) Foreign Application Priority Data

Apr. 20, 2012 (DE) .................. 10 2012 007 791

(51) Int. Cl.
*B23K 26/00* (2014.01)
*B29C 67/00* (2017.01)
(Continued)

(52) U.S. Cl.
CPC ........ *B29C 67/0077* (2013.01); *B22F 3/1055* (2013.01); *B29C 64/153* (2017.08);
(Continued)

(58) Field of Classification Search
CPC ............ B29C 67/0062; B29C 67/0066; B29C 67/0088; B23K 26/00
(Continued)

(56) References Cited

U.S. PATENT DOCUMENTS 5,626,919 A * 5/1997 Chapman ................ B29C 41/12
118/413
5,651,934 A * 7/1997 Almquist ................ B29C 41/12
118/100
(Continued)

FOREIGN PATENT DOCUMENTS

DE 102008019330 10/2009
DE 102009035258 2/2011
(Continued)

OTHER PUBLICATIONS

International Preliminary Report on Patentability for PCT/EP2013/001050 dated Oct. 21, 2014.
(Continued)

*Primary Examiner* — Dana Ross
*Assistant Examiner* — Ayub Maye
(74) *Attorney, Agent, or Firm* — Seyfarth Shaw LLP

(57) ABSTRACT

The invention relates to a beam melting installation and method for producing components thereof, in which a component to be produced is produced layer-wise, wherein, a coating slide moves across a build platform, a powder layer is applied onto the build platform and already produced component layers by a blade fastened on the coating slide, and melt traces are subsequently inscribed in the powder layer by means of a directed beam, so that the powder melts in the melt trace and bonds to underlying component layers, wherein, during the travel of the coating slide in order to apply a new powder layer, perturbations of the travel of the coating slide or components connected thereto are metro- (Continued)

logically detected, and in particular the beam melting installation is controlled and/or regulated as a function of the detected measured values. The invention furthermore relates to a device for retrofitting beam melting installations.

7 Claims, 2 Drawing Sheets

(51) Int. Cl.
| | |
|---|---|
| B22F 3/105 | (2006.01) |
| B33Y 10/00 | (2015.01) |
| B33Y 30/00 | (2015.01) |
| B33Y 50/02 | (2015.01) |
| B29C 64/153 | (2017.01) |
| B29C 64/20 | (2017.01) |
| B29C 64/386 | (2017.01) |
| B29L 9/00 | (2006.01) |

(52) U.S. Cl.
CPC ............ *B29C 64/20* (2017.08); *B29C 64/386* (2017.08); *B33Y 10/00* (2014.12); *B33Y 30/00* (2014.12); *B33Y 50/02* (2014.12); *B22F 2003/1057* (2013.01); *B29L 2009/00* (2013.01); *Y02P 10/295* (2015.11)

(58) Field of Classification Search
USPC ............... 219/121.6, 121.65, 121.66, 121.85
See application file for complete search history.

(56) References Cited

U.S. PATENT DOCUMENTS

| | | | | |
|---|---|---|---|---|
| 6,656,410 | B2* | 12/2003 | Hull .................... | B29C 41/12 |
| | | | | 264/113 |
| 7,540,996 | B2* | 6/2009 | Bampton .............. | B22F 1/0003 |
| | | | | 419/53 |
| 7,780,897 | B2* | 8/2010 | Wicker ............... | B29C 67/0055 |
| | | | | 264/233 |
| 7,847,212 | B2* | 12/2010 | Renz .................... | B22F 3/003 |
| | | | | 219/121.61 |
| 8,945,456 | B2* | 2/2015 | Zenere ............... | B29C 67/0066 |
| | | | | 264/401 |
| 9,421,715 | B2* | 8/2016 | Hartmann .......... | B29C 67/0062 |
| 2002/0195747 | A1 | 12/2002 | Hull | |
| 2008/0241404 | A1* | 10/2008 | Allaman ............. | B29C 67/0081 |
| | | | | 427/333 |
| 2013/0000553 | A1 | 1/2013 | Hoechsmann et al. | |

FOREIGN PATENT DOCUMENTS

| | | |
|---|---|---|
| DE | 102009056687 | 6/2011 |
| EP | 1769903 A2 | 4/2007 |
| EP | 2052693 A1 | 4/2009 |
| EP | 2319701 A1 | 5/2011 |
| JP | H0483671 A | 3/1992 |
| WO | WO 2007139938 A2 | 12/2007 |
| WO | WO 2012/097799 A2 | 7/2012 |

OTHER PUBLICATIONS

International Search Report for PCT/EP2013/001050 dated Aug. 9, 2013, 7 pages.

* cited by examiner

METHOD AND DEVICE FOR PRODUCING COMPONENTS IN A BEAM MELTING INSTALLATION

CROSS REFERENCE TO RELATED APPLICATIONS

This application is a national phase application of international patent application PCT/EP2013/001050, filed Apr. 10, 2013, which claims the benefit of German application DE10 2012 007 791.2 filed Apr. 20, 2012, the disclosures of which are incorporated by reference in their entirety.

SUMMARY

The invention relates to a method for producing components in a beam melting installation, in which at least one component to be produced is produced layer-wise, wherein, in order to produce each component layer by means of a coating slide, which moves across a build platform, a powder layer is applied onto the build platform and already produced component layers by a blade fastened on the coating slide, and melt traces are subsequently inscribed in the powder layer by means of a directed beam, in particular a laser beam or electron beam, so that the powder melts in the melt trace and bonds to underlying component layers.

The invention furthermore relates to a beam melting installation for layer-wise production of at least one component, having a process chamber and a build platform, arranged height-adjustably therein, on which the at least one component can be produced, a coating slide being movable across the build platform in order to produce each component layer, in order to apply a powder layer onto the build platform and already produced component layers by a blade fastened on the coating slide, and subsequently to inscribe melt traces in the powder layer by means of a directed beam, in particular a laser beam or electron beam, so that the powder can be melted in the melt trace and bonds to underlying component layers.

The invention furthermore relates to a device for retrofitting beam melting installations, for example of the aforementioned generic type, in order to carry out the component production method according to the invention described below with this beam melting installation.

BRIEF DESCRIPTION OF THE DRAWINGS

Embodiments of devices, systems, and methods are illustrated in the figures of the accompanying drawings which are meant to be exemplary and not limiting, and in which.

DETAILED DESCRIPTION

Figure 1:
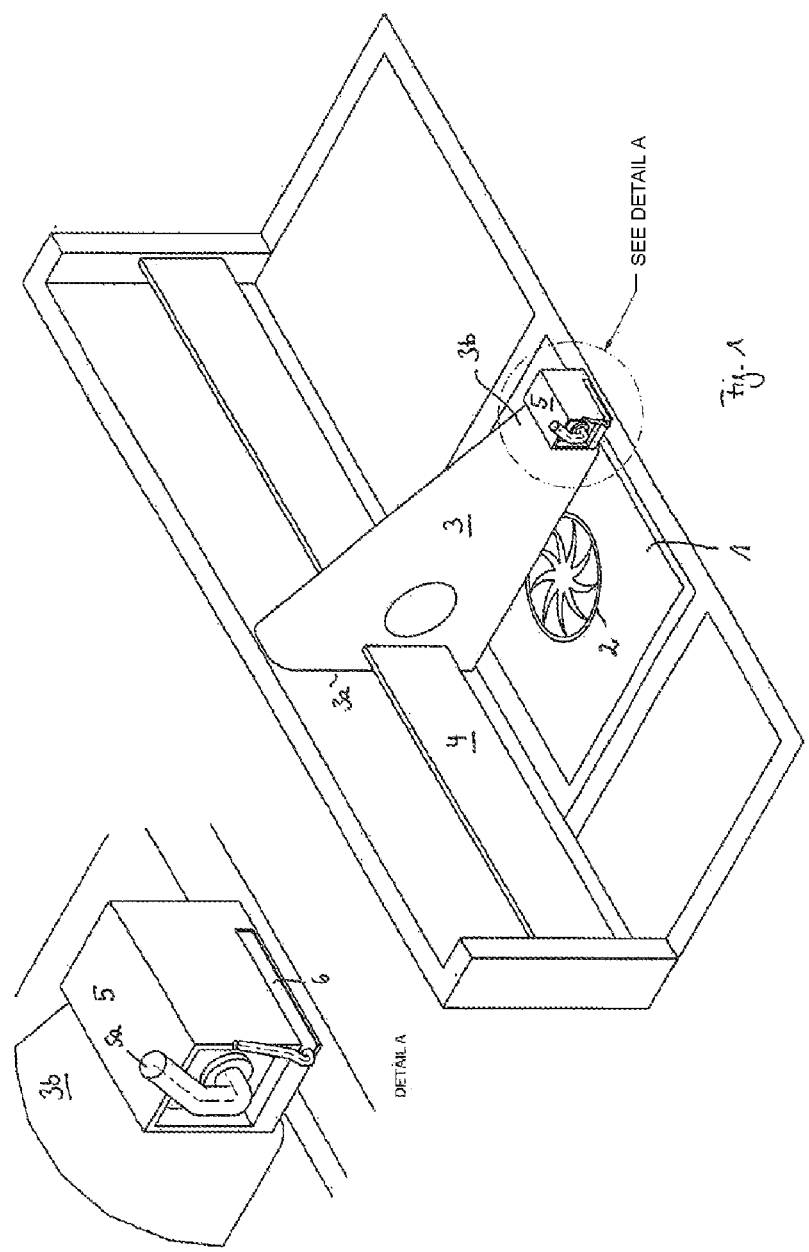
FIG. 1 shows the view of a coating slide above a build platform inside a beam melting installation.

Beam melting installations are, according to general definition, for example according to VDI 3404, installations in which essentially arbitrarily shaped components can be produced layer-wise. Such installations are preferably used for so-called "rapid prototyping", that is to say the production of functional prototypes of serial nature. In the context of the invention, a beam melting installation is an installation in which, for the layer-wise construction of at least one component, powders of a material, which is in principle to be regarded as meltable, in particular weldable, is melted by means of a beam carrying energy, in particular an electromagnetic wave (for example laser beam) or a particle beam, in particular an electron beam, in melt traces. Beam melting installations in the context of the invention therefore comprise both installations with which (and preferably) metal powder can be processed and installations in which plastic powder is processed. The latter installations are also referred to as generative manufacturing installations or laser sintering systems.

It is an essential working principle of such a beam melting installation that at least one component to be produced is successively constructed layer-wise on a build platform in a process chamber of such a beam melting installation, to which end the build platform is initially coated uniformly with a thin powder layer of a powder to be melted, with a thickness of for example a few micrometers, for example 20 micrometers, by a coating slide with a blade arranged on its lower side applying or distributing the powder on the build platform.

With a beam directed onto this powder layer from above, in particular a laser beam or electron beam, melt traces can be inscribed in the powder, so that the powder melts at the impact point of the beam on the powder surface and is bonded together or, if layers of the component have already been produced underneath, also bonds to this layer.

After the production of such melt traces in order to produce a component layer, the build platform is lowered in order to apply a new powder layer with the coating slide, and produce the next melt traces.

Thus, successively, at least one component to be produced is constructed layer-wise on the platform and, after a possibly very time-consuming production process, can be removed from the beam melting installation as a component ready for use.

Components of this type can be produced from various powder materials, for example of metal, but also of plastics. Corresponding material is selected for the powder.

What is essential for the method is that the production of a layer of the component to be constructed layer-wise always takes place in the same plane of the beam melting installation, to which end the build platform is successively moved downward with increasing layer construction, in order to allow the coating slide to travel over and to carry out a new powder application in the production plane.

Owing to the very small layer thicknesses, which lie in the range of a few micrometers, for example 20 micrometers, a previously produced top component layer is travelled over at a very small distance by the blade of the coating slide.

As a result of internal stresses, for example in the top component layer, but also component regions lying underneath, owing to the thermal melting/welding method stress states can occur, in which component regions plastically deform and therefore rise in the direction of the production plane of the next layer, and possibly protrude therein. Such an effect may, for example, occur in the case of components which have overhang surfaces, for example oblique blade surfaces of turbine wheels, etc.

In such a situation, it may arise that during the next coating process, when the coating slide with the blade travels over the build platform, in order to apply a new powder layer, the blade collides with or contacts a raised point of the previously produced component layer.

This can lead to an offset of the subsequently produced component layer relative to the previous one, if the coating slide can travel further in spite of the contact, but also in the extreme case the coating slide with the blade will jam on the component, so that on the one hand the production process cannot be continued and, on the other hand, component damage usually occurs, as a result of which the component can no longer be used.

Often, the situation is such that this type of raising of particular points of a produced component is a deteriorating process, which can mean that further raising in the direction of the production plane takes place with each layer produced, and the distance of the top produced component layer from the blade of the coating slide during the travel thereby decreases successively.

It is therefore the object of the invention to provide a method, and devices for carrying out the method, with which the possibility is provided of promptly detecting such thermal deformations on the coating layers during production, for example in order to instigate countermeasures, and in particular in order to implement control or regulation in the production process and thus prevent further deformations.

It is therefore another object of the invention to optimize a method for producing components in a beam melting installation, in such a way that the risk of a collision between the blade and the previously produced coating layer is constantly prevented, and an entire production process can therefore be completed.

Preferably, it is furthermore an object of the invention to implement quality assurance measures by the method according to the invention, in order to detect and document possible collisions between the blade of the coating slide and the top component layer, and to identify the components affected.

According to the invention, the object is achieved by a method of the generic type mentioned in the introduction, which is refined in that, during the travel of the coating slide in order to apply a new powder layer, perturbations of the travel of the coating slide or components connected thereto are metrologically detected.

In this case, in particular, according to a preferred refinement, the beam melting installation may be controlled or even regulated as a function of the detected measurement values, so that feedback in the component production process can take place as a function of the measurement values, in order to counteract the thermal deformation effects mentioned in the introduction.

The object is furthermore also achieved by a beam melting installation, in particular a generative manufacturing installation, of the type mentioned in the introduction, which is furthermore configured, during the travel of the coating slide in order to apply a new powder layer, to metrologically detect as mentioned perturbations of the travel of the coating slide or components connected thereto, for example in order to implement control or regulation as a function of the detected measurement values.

A particular solution of the object is also obtained by providing a device for retrofitting beam melting installations, which comprises at least one sensor unit, which can be connected to the coating slide or to a component arranged thereon, and is suitable for detecting perturbations of the travel of the coating slide, in particular perturbations and/or deflections of the coating slide or of the component arranged thereon, which occur during the travel of the coating slide, and which furthermore comprises a data processing system for detecting measurement values from the sensor unit and for evaluating the measurement values, which is preferably also configured in order to monitor the detected measurement values for the exceeding of at least one limit value and, as a function of the exceeded limit value, to initiate actions which are suitable for acting on the control of a beam melting installation.

In this case, it has been found to be particularly advantageous when a retrofitting device is configured in such a way that it provides the possibility of simulating an error event which is monitored by the control of the beam melting installation.

In this way, it is possible to accommodate the fact that conventional beam melting installations do not provide an interface for externally intervening in the control of this beam melting installation, so that simulation of an error event provides the possibility of generating an event which is autonomously monitored by the control of the beam melting installation.

The essential core concept of the invention is that, during travel of the coating slide across the build platform, and coating layers possibly already produced beforehand, for the purpose of powder application this coating slide with the blade arranged thereon normally carries out an extremely uniform, that is to say constant and not further accelerated, travel, so as likewise to achieve uniform powder application with a defined layer thickness.

Owing to the possibly occurring effects, mentioned in the introduction, that component regions in the top and therefore last produced component layer or even in other regions deform owing to thermal effects and rise in the direction of the blade of the coating slide, in the extreme case contact between the blade and the component can occur, which perturbs the travel, that is to say the uniformity of the travel of the coating slide, and can therefore be detected metrologically.

However, perturbations of this uniform travel occur not only when in the extreme case the blade collides with the component layer produced last, but even already when the distance between the component layer produced last and the lower edge of the blade is successively reduced, because in this way the applied powder must be distributed in a smaller gap width between the lower edge of the blade and the last component layer, which has repercussions on the blade and therefore on the uniformity of the movement of the slide, even when direct contact has not yet taken place.

The essential contact of the invention is then based on metrologically detecting such perturbations, which cause deviations from the uniformity of the movement of the coating slide, in which case these deviations may be represented by the detected measurement values, or determined from these measurement values. To this end, for example, it is possible to use sensors and evaluations which detect such perturbations, and in particular therefore the deviation, or the size of the deviations, of a monitored quantity from a normal value.

Thus, according to the invention it is possible to react to even minor perturbations, i.e. deviations from the standard uniformity, and thus to avoid full contact of the blade and the components to be produced, for example by implementing control or regulation in the beam melting installation, or the production process, as a function of the detected perturbations or the detected measurement values.

According to the invention, perturbations of the travel of the coating slide may be detected in a variety of ways, which are in principle alternatives to one another. It has, however, been found particularly advantageous to detect perturbations of the travel with the aid of metrological detection of perturbations of the coating slide or components connected thereto.

Thus, this concept is essentially based on the idea that ideal travel of the coating slide, apart from the start and stop of the coating slide, is free from acceleration and therefore (ideally considered) there is no perturbation in the coating slide or components arranged thereon. Perturbations do, however, occur owing to the process of applying the powder, or unavoidable perturbations are increased by this process, particularly when the distance between the component layer produced last and the blade decreases. Thus, the application process so to speak generates a kind of "scratching" of the blade on the component surface by the powder, since there is friction thereon.

According to the invention, it may in this case be proposed to detect the perturbations with the aid of accelerations which occur on the coating slide or on a component connected thereto, i.e. for example on the blade. Likewise, it is also possible to detect the amplitude and/or frequency of the generated perturbations using correspondingly suitable sensors. Piezo sensors may for example be used to detect the acceleration mentioned in the introduction, and structure-borne sound sensors may for example also be used for the amplitude and/or frequency of perturbations.

In another configuration of the invention, provision may also be made to carry out metrological detection of forces, in particular forces which act against the travel direction of the coating slide, and therefore essentially brake the coating slide, when the powder is being distributed on the component layer produced last in a gap becoming smaller and smaller between the blade and the component layer. Suitable force sensors may for example also be used for this, for example piezo-based force sensors, on a coating slide or on a component connected thereto.

In another alternative, provision may also be made to carry out metrological detection of the drive power or of the driving currents and/or voltages of the motor with which the coating slide is moved. Thus, particularly in the event of contact between the blade and the component, the drive currents are increased significantly so that such an increase can be metrologically evaluated in order to initiate corresponding actions, for example an emergency stop.

In yet another alternative, provision may also be made to metrologically detect deflections of the coating slide or components connected thereto from a normal position. To this end, for example, at least one strain gauge may be used as a sensor, for example on the blade or on the coating slide. Such strain gauges change their resistance when stretched or compressed, so that a deflection can thereby be detected, for example by direct resistance measurement or alternatively current or voltage measurement, depending on the way in which the sensor is connected.

In another embodiment provision may also be made to metrologically detect acoustic sound by means of a microphone as a sensor, particularly inside the production chamber, since travel of the coating slide across a component generates, particularly upon contact, noises which can be detected. In this case, the microphone may on the one hand be arranged stationary in the chamber, but on the other hand it may also be moved together with the coating slide, preferably arranged on a lower side of the coating slide, in order to be able to directly receive sound produced there.

Particularly in the case of the aforementioned preferred detection of perturbations, for example by acceleration measurement for measurement of amplitude and/or frequency by means of a suitable sensor, provision may be made to arrange the sensor on or close to the free end of a coating slide, that is to say the end of the coating slide which lies opposite a guide in which the coating slide is guided during travel across the build platform. This embodiment is preferably used in installations in which the coating slide is guided on only one side. At this free end, possibly generated perturbations become particularly significant and can be detected well with sensors arranged there.

According to the invention, provision may be made to detect the measurement values, for example of aforementioned suitable sensors, only within a subregion of the overall travel distance of the coating slide, preferably namely within the subregion in which the components to be produced are arranged on a build platform.

Thus, specifically the initial acceleration regions and the braking regions at the end may be omitted from the metrological detection of measurement values as well as regions in which no component is arranged on the build platform, since measurement values possibly recorded in such regions cannot have necessary relevance of the method and in this way, for example, the amount of data can be reduced.

The subregion in which the detection of measurement values is intended to be carried out may, for example, be established computationally, for example from the control of a beam melting installation, sine the regions in which the components are arranged inside a build platform being known to this control. For example when a coating slide is driven by stepper motors, step regions may be defined in which the measurement value detection is intended to take place, or is not intended to take place.

If access to the control of beam melting installations is not possible, provision may be made to enable or interrupt the measurement value detection by means of an additional sensor means, for example inside a chamber for the production of components, which may be arranged in a beam melting installation and observes the movement of the coating slide by sensing.

To this end, for example, a proximity sensor may be arranged on the coating slide itself, which sensor is moved along a proximity object with the movement of the coating slide, the proximity object defining by its length extent along the travel path the region in which the measurement values are intended to be detected.

Thus, the proximity object may for example have a length extent which is less than or at most equal to the length of the build platform in the movement direction of the coating slide.

In such a case, the coating slide with the proximity sensor will not record measurement values when starting the travel of the slide, since in this case the proximity sensor has not yet reached the vicinity of the aforementioned proximity object. Only when this is the case and the proximity sensor has detected the proximity can the measurement value detection be initiated in this way, until the proximity sensor has fully moved along the proximity object and passed it, after which the measurement value detection is interrupted.

For example, a proximity object may be formed magnetically so as to initiate or end the measurement value detection by the magnetic field effect relative to the proximity sensor, for example by the reed contact or alternatively by mechanically switching contacts.

As an alternative to the aforementioned solution, other possibilities may also be used in order to define subregions for the detection of measurement values along the travel path of the coating slide.

Irrespective of the type of measurement values used, or the type of sensor used, in order to detect perturbations in the travel of the coating slide, in a particularly preferred refinement of the invention provision is made to check the detected measurement values for the exceeding of at least one stored limit value, and preferably even the exceeding of a plurality of stored limit values, in particular at successively increasing limit values, and in the case of a plurality of such given limit values to initiate different limit value-dependent actions. When a plurality of limit values are exceeded within a coating run, provision may be made to initiate all actions which are assigned to the exceeding of the individual limit values, or alternatively only to initiate the action which is assigned to the largest limit value exceeded.

Thus, provision may for example be made that, when a particular limit value is exceeded, for example a particular acceleration value, which is measured on the coating slide or on a component arranged thereon, an action is initiated which has for example a purely informative nature, but has no direct effect on the control or a regulation of the beam melting installation. In an exemplary application, provision may be made that, when such a limit value is exceeded, for example the first of a plurality of limit values, signaling is merely carried out, for example optically or acoustically, or telecommunication to an operator of the installation is carried out, for example by sending an SMS, an email or a similar message to a telecommunication device of the operator, in order to inform him of a possibly developing perturbation.

Furthermore, provision may be made that, when a stored limit value is exceeded, for example one which is greater than the aforementioned limit value, intervention is carried out in the control of the beam melting installation. Such an intervention may, for example, consist in modifying production parameters.

For example, provision may be made that, in the event of such exceeding of the aforementioned limit value, a double exposure of the same powder layer is carried out, i.e. for example to travel over the programmed melt traces again with the laser. Another action may also provide modification of the laser energy, for example in order to increase or optionally even decrease it, or to modify, for example reduce, the speed with which the melt trace of the laser beam is inscribed.

Another action, particularly when exceeding a limit value which is in turn higher than the aforementioned limit value, may provide that, during the coating with powder, a greater layer thickness is used, or coating is carried out several times, so that greater layer thicknesses are thereby produced, after which the melt traces are then inscribed with a layer thickness increased in this way. Likewise, it is also possible here, after such a limit value is exceeded, in turn also to modify other process parameters, in particular exposure parameters during the inscribing of the melt traces.

Another action may also provide, particularly when a stored limit value is exceeded, for example one which is greater than the aforementioned limit values, that an emergency stop of the installation is carried out, for example when by the observation of the measurement values and the exceeded limit values, it is apparent that a collision of the blade with a produced component layer is either immediately imminent or has currently taken place.

Thus, according to the invention, provision may for example be made to define a group of measurement values, which are ordered in terms of size, that is to say absolute values, in order to carry out different interventions, in particular interventions with a different level of the fact, in the control or regulation of the installation with increasing size of the limit values.

In one refinement, which may in particular also be combined with the preceding embodiment, provision may be made that, as a function of the detected measurement values, for example acceleration values, and here in particular when an in turn stored predetermined limit value is exceeded, a current production situation is detected photographically or videographically, to which end for example a corresponding camera may be provided inside the production chamber of such a beam melting installation.

Thus, it is possible to detect which component on the build platform is affected by the detected situation of the limit value exceeding, since the photograph or video taken then correlates chronologically with the exceeding of the limit value.

Provision may also be made that, as a function of the detected measurement values, i.e. for example the exceeding of an in turn predetermined stored limit value, the component to be produced currently arranged under the coating slide, from a group of a plurality of components arranged on a build platform, is excluded from the further production process.

In this case, the component may for example be identified photographically or videographically in connection with the embodiment mentioned above, or alternatively it is possible to evaluate, or for example additionally detect, the current position of the coating slide along its travel path, in particular so as to exclude from the further production the component or those components which are arranged within a position interval that comprises the detected position.

It is thus possible to ensure that no defective components are produced, but the further production step of possibly other components of a group of a plurality of components can be continued. In this case, it is also furthermore to be regarded as advantageous that no further production time is expended for the previously detected at least one component, which is excluded from the further production, so that the other components can then be completed in a shorter time.

In one refinement, provision may likewise be made that, as a function of the detected measurement values, in particular in turn when a predetermined, for example stored, limit value is exceeded, and particularly in the case of the greatest of all the limit values, an emergency stop of the beam melting installation is generated. Particularly preferably, provision may be made to generate such an emergency stop before actual contact has taken place between the blade and the component.

As mentioned in the introduction, it is also an essential advantage of the method according to the invention that it can be retrofitted in the case of existing beam melting installations, even if these do not allow an interface for intervention in the control of the beam melting installation. For example, at least the function of the emergency stop may be implemented, but optionally also other actions, in particular such actions as are automatically monitored by the control of the beam melting installation.

Thus, for example, it is regularly the case that in beam melting installations of the generic type mentioned in the introduction, as well as of the inventive type, the powder stock for producing the individual layers is monitored, in order to stop the installation when the powder stock becomes too low, or no more powder is available.

It is therefore possible, in a device for retrofitting beam melting installations, to provide that an error event can be generated thereby, which is monitored by the control, for example i.e. the error event that no more powder is present is generated, even though this is not factually correct. For example, provision may thus be made to use an actuator or signal generator which actuates a sensor for monitoring a particular error event, for example the powder stock, despite the actual absence of the specific error event, and to simulate and artificially initiate this actuation of the error event.

In such a case, the installation thus believes that it has detected the monitored error event and initiates the emergency stop, so that servicing personnel can intervene in the production process, for example in order to remove the error manually or interrupt the production process.

According to the invention, provision is accordingly made to provide a retrofitting device which comprises the at least one sensor unit mentioned in the introduction, that can be arranged on a coating slide in order to record measurement values thereon, for example perturbations, or accelerations which are caused by perturbations, during the powder application.

By a cable or wireless link, the measurement values can be transmitted from the production chamber of a beam melting installation to a data processing system, and evaluated there, for example with respect to the exceeding of one or more different limit values, so as then to initiate actions, for example the aforementioned emergency stop function, by simulation of an error event.

Accordingly, such a retrofitting device thus for example comprises an actuator with which it is possible to act mechanically on a sensor of the beam melting installation, which is provided on the producer side for monitoring an error event, or alternatively it is also possible to drive a signal generator as a function of at least one limit value, in order to provide, or to generate, an electrical signal which can therefore then be switched purely electrically to a sensor for monitoring the error event.

An exemplary embodiment of the invention will be described in more detail below.

FIG. 1 essentially shows a simplified internal view of a beam melting installation, or of a chamber provided therein, for producing at least one component to be constructed layer-wise. FIG. 1 essentially represents a build platform 1, on which a single component 2 is intended to be produced layer-wise here for simplification.

To this end, the coating slide 3, comprising a powder application device and a blade (not visible here) arranged below the slide 3, moves across the build platform 1 in order to apply a thin powder layer, for example of a few micrometers, onto the build platform. By a laser beam (not further represented here), a melt trace, which corresponds to the component cross section of the component to be produced in the current processing step, is inscribed in the powder surface. The component 2 in FIG. 1 corresponds here essentially to a blade wheel, which is intended to be produced layer-wise.

The coating slide 3 comprises a fixed end 3a, which is guided on a guide 4, so as to guide the coating slide along the powder application path across the build platform 1. The opposite end 3b, conversely, is free in the present case, i.e. it is not mechanically supported, although in other embodiments of beam melting installations it may however also be guided.

The installation according to the invention shown here comprises in the also furthermore highlighted detail view at the free end 3b of the coating slide 3 an e.g. piezo-based acceleration sensor 5 which detects acceleration values of the free end of the coating slide during the coating run, that is to say during the powder application during the travel across the platform 1. By cabling, for example by the cable 5a partially represented here of the sensor, the detected measurement values are transmitted to a data processing system (not shown).

FIG. 1 shows here a preferred refinement of the invention represented here, in which another sensor 6, here a proximity sensor 6, is arranged at the free end 3b of the coating slide, which sensor is for example positioned in the same housing as that accommodating the acceleration sensor 5. By means of a proximity object (not further shown here), when the proximity sensor 6 moves past the proximity object (not shown) it is possible to detect whether the sensor 5 for recording acceleration measurement values lies in a region in which a component is arranged on the build platform, or in a region without a component. Thus, the measurement value detection may for example be triggered with the aid of a signal of the proximity sensor 6, so that the amount of data acquired is reduced. By means of this embodiment, the measurement values are then recorded, and acquired by the data-processing system, only on a subregion of the overall travel path of the slide 3.

Figure 2:
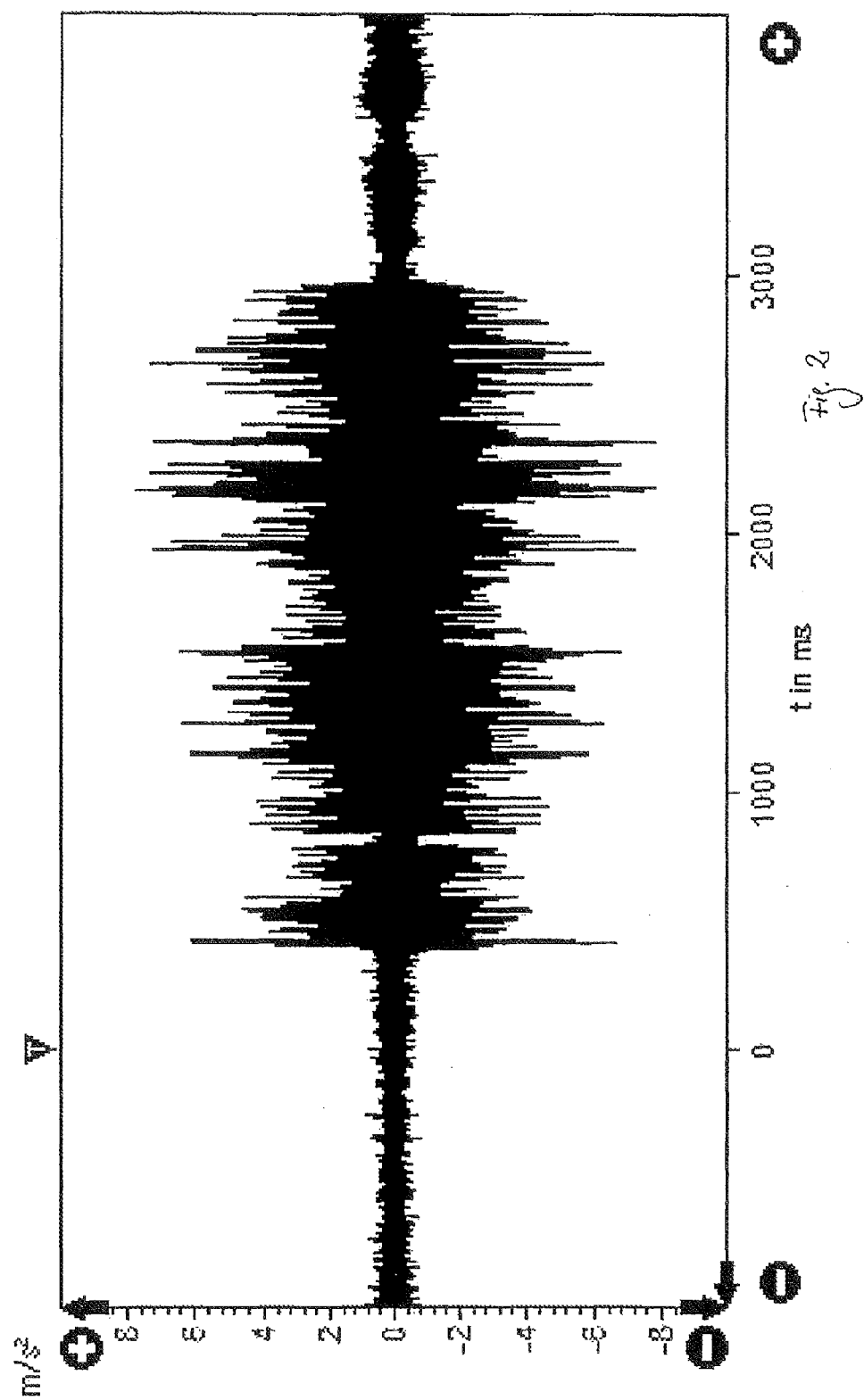
FIG. 2 shows an exemplary representation of detected measurement values.

FIG. 2 shows, plotted against time, the detected measurement values, in the present case acceleration measurement values, which can be recorded by a sensor 5 according to FIG. 1. It is clearly shown in the representation of FIG. 2 that, in the left and right lateral edge regions of this diagram plotted against time, only very low acceleration values of about 2 m/s2 are detected, which for example indicate that there is no perturbation in the travel of the coating slide. These may, for example, be regions in which there are no components on the build platform, and therefore in particular the initial regions as well as the end regions of the build platform in the case of a component arranged, for example, centrally thereon, as shown by way of example in FIG. 1.

When, conversely, the coating slide 3 with the blade travels across the component already partially produced layer-wise for the purpose of powder application, then larger perturbations are generated at the free end of the coating slide 3, which are represented in FIG. 2 by measurement values up to the range of 8 m/s2.

It is found that, with the aid of such a diagram, it is possible to define limit values which can be checked by the data-processing system with respect to being exceeded by the detected measurement values. As a function of whether one or even more limit values, in particular graded in size, is exceeded, different actions may therefore be carried out by the device according to the invention, for example controls or even interventions in the regulations of the beam melting installation, as described in the general part.

Instead of an acceleration sensor, it is likewise possible to arrange other types of sensors, likewise on the free end of the coating slide 3, for example sensors which detect the perturbation amplitude or alternatively the perturbation frequency. It is thus also possible, for example, after a Fourier transform of measurement values detected as a function of time, with the aid of the perturbation frequencies and amplitude occurring, or as a function thereof, to carry out action and therefore interventions in the control or regulation of the beam melting installation.

What is claimed is:

1. A method for producing objects in an additive manufacturing build process in which a layer of powder is spread over a build area with selective melting or sintering of one layer after another of powder in building up of an object, comprising the steps of:

providing an additive manufacturing machine using a powder build material, the additive manufacturing machine including the build area in which the object is generated through layerwise manufacture according to a build process control, and providing a supply of powder to the build area, the additive manufacturing machine further including a coating device for spreading a powder layer across the build area from the supply, the coating device having a bottom surface which is moved in a plane parallel to the surface of the build area to thereby spread the powder build material in the powder layer;

using a sensor on the coating device to determine a surface topography of a previous powder layer through detected movement of the coating device out of the plane of the coating device across the previous powder layer caused by engagement of the coating device with the surface of the previous powder layer; and then adjusting at least one parameter of the additive manufacturing build process in view of an irregular movement of the coating device during the additive manufacturing build process as determined by the sensor.

2. The method as claimed in claim 1, wherein the irregular movement is detected by at least one of the following alternatives yielding measurement values:
a) metrological detection of perturbations of the coating device or a component connected thereto, by measurement of accelerations and/or of a amplitude and/or frequency, by the sensor on the coating device or the component connected thereto;
b) metrological detection of forces acting against a travel direction on the coating device or the component connected thereto; by the sensor on the coating device or the component connected thereto;
c) metrological detection of a drive power or the driving currents of a motor, with which the coating device is moved;
d) metrological detection of acoustic sound by a microphone;
e) metrological detection of deflections of the coating device or the component connected thereto by at least one strain gauge.

3. The method as claimed in claim 2, wherein the perturbations or measurement values are only detected within a subregion of an overall travel distance of the coating device, all objects to be produced being arranged inside the subregion.

4. The method as claimed in claim 2, wherein the detected measurement values are checked for exceeding of at least one stored limit value, with different limit-value-dependent actions being initiated for a plurality of predetermined limit values.

5. The method as claimed in claim 2, further comprising, when a predetermined limit value is exceeded, generating an emergency stop of the additive manufacturing build process.

6. An additive manufacturing machine for producing objects in an additive manufacturing build process in which a layer of powder build material is spread over a build area with selective melting or sintering of one layer after another of powder in building up of an object, the machine including the build area in which the object is generated through layerwise manufacture according to a build process control, and a supply of powder build material to the build area, the additive manufacturing machine further comprising:
a coating device for spreading a powder layer across the build area from the supply, the coating device having a bottom surface which is moved in a plane parallel to the surface of the build area to thereby spread the powder build material in the layer; and
a sensor on the coating device to determine a surface topography of a previous powder layer through detected movement of the coating device out of the plane of the coating device across the previous powder layer caused by engagement of the coating device with the surface of the previous powder layer,
wherein the additive manufacturing machine is configured to adjust at least one parameter of the additive manufacturing build process to in view of an irregular movement of the coating device constituting an undesired deviation to the additive manufacturing build process as determined by the sensor.

7. The apparatus of claim 6, further comprising at least one sensor on the coating device or on a component connected thereto, by which the perturbations and/or deflections of the coating device, or of the component connected thereto, occurring during a travel can be metrologically detected.

* * * * *